No. 815,771. PATENTED MAR. 20, 1906.
P. C. WHITE.
PLANTER.
APPLICATION FILED AUG. 29, 1905.
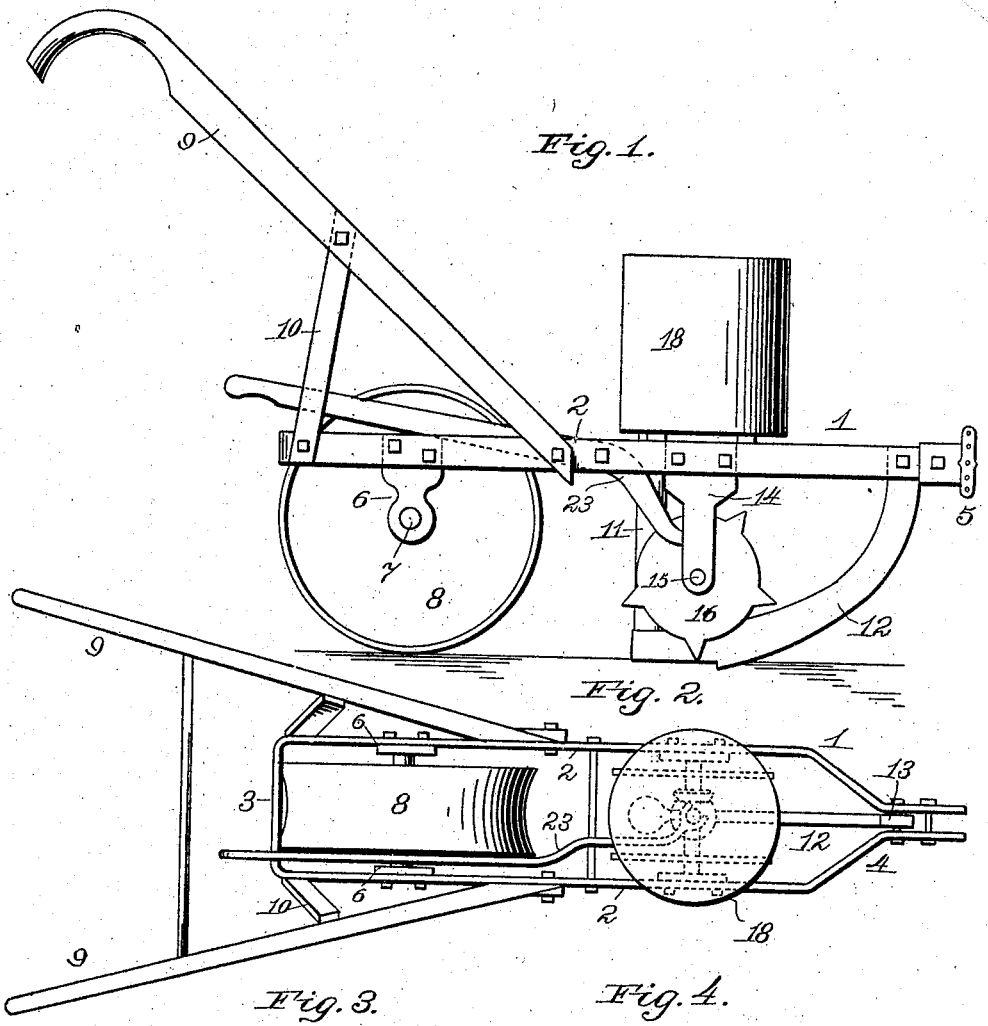
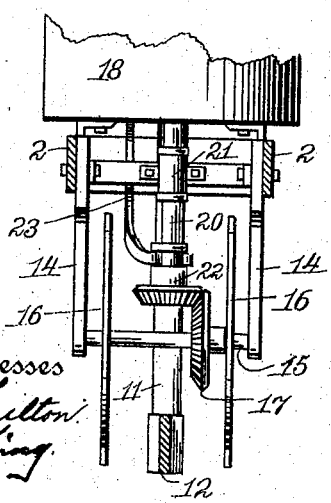
Witnesses
L. O. Hilton
M. J. King
Inventor
Phylander C. White,
by J. W. Garner
Attorney

UNITED STATES PATENT OFFICE.

PHYLANDER C. WHITE, OF MEMPHIS, TENNESSEE, ASSIGNOR OF ONE-HALF TO WILLIAM S. BRIAN, OF MEMPHIS, TENNESSEE.

PLANTER.

No. 815,771.   Specification of Letters Patent.   Patented March 20, 1906.

Application filed August 29, 1905. Serial No. 276,190.

*To all whom it may concern:*

Be it known that I, PHYLANDER C. WHITE, a citizen of the United States, residing at Memphis, in the county of Shelby and State of Tennessee, have invented new and useful Improvements in Planters, of which the following is a specification.

My invention relates to improvements in planters; and it consists in the construction, combination, and arrangement of devices hereinafter described and claimed.

One object of my invention is to simplify the construction of the planter.

A further object is to secure a more direct transmission of the power required to operate the seed-dropping mechanism.

A further object is to effect improvements in the gearing for operating the seed-dropping mechanism whereby the speed of the latter may be varied, a final object being to effect improvements in the means for forming the seed-drills and covering the seeds.

In the accompanying drawings, Figure 1 is a side elevation of a planter embodying my improvements. Fig. 2 is a top plan view of the same. Fig. 3 is a vertical transverse sectional view of the same, and Fig. 4 is a detail vertical longitudinal sectional view of the same.

The main frame 1 is made from a single bar of metal, bent to form the parallel sides 2, the rear cross-bar 3, and the ends of which are turned inwardly toward each other and then extended forwardly, as at 4. A suitable clevis 5 is attached to the front end of the frame. To the sides of the frame, near the rear end thereof, are secured depending bearing-standards 6, in which is journaled the shaft 7 of the covering-wheel 8, said wheel being preferably made of metal and having a concave periphery, as shown. Handles 9, which are preferably made of wood, are secured to the sides of the frame and are provided with braces 10.

The seed-tube 11 rises from the rear end of the furrow-opening runner 12, which has its front upcurved end secured between the front ends of the side bars of the main frame, as at 13. Standard-bearings 14 are secured to the side bars of the main frame and depend therefrom, are disposed slightly in advance of the seed-tube, and a shaft 15 is journaled in said bearing-standards. On the said shaft are secured thin steel disks 16, which are appropriately spaced apart and are provided with peripheral spurs to engage the soil and cause said disks to rotate when the planter is in use. Said disks are opposite and proximate to the discharge end of the seed-tube, so that they cut into the soil at opposite sides of the furrow made by the runner to pulverize the sides of the furrow, and hence put the soil in such condition that the furrow will be filled and the seeds covered by the covering-wheel. On said shaft 15 is a miter-gear 17.

The hopper 18 is secured on the main frame, and in the bottom thereof is a revoluble seed-dropping plate 19. Said plate is revolved by a vertical shaft 20, which has its bearing at 21, and to the lower end thereof is splined a vertically-shiftable miter-gear 22, which may be moved either into or out of engagement with the gear 17. A lever 23, which is fulcrumed to the main frame, is connected to the said shiftable gear 22 and may be readily operated to shift said gear, as will be understood. It will be observed that the gears are of unequal size. Hence they may be transposed to vary the speed of rotation of the seed-dropping plate. Said gears connect the shaft of the seed-dropping plate directly to the shaft of the furrow-pulverizing disks, so that the transmission of power from said disks to said plate is direct and positive.

Having thus described my invention, I claim—

1. The herein-described planter comprising the frame having the depending standards near its front and rear ends, the covering-wheel having its bearings in the rear standards, the hopper secured on the frame above the front standards and having the revoluble seed-dropping element, the vertical shaft to which said seed-dropping element is attached, the gear shiftable on said vertical shaft, the lever to shift said gear and having its fulcrum on the said frame, the furrow-opening runner having its front end attached to the front end of the frame and provided at its rear end with the seed-tube, the shaft having its bearings in the front standards and provided with the gear for engagement with and disengagement by the shiftable gear, and the pulverizing-disks on said shaft and opposite and proximate to the discharge end of the seed-tube.

2. A planter having pulverizing-disks, a shaft to which said disks are attached, a gear-wheel on said shaft, a revoluble seed-dropping element, a vertical shaft depending therefrom, a shiftable gear on said vertical shaft, and a lever, carried by the planter and connected to the shiftable gear, to move the latter into or out of engagement with the gear on the disk-shaft.

In testimony whereof I affix my signature in presence of two subscribing witnesses.

PHYLANDER C. WHITE.

Witnesses:
    IRVIN F. BENSDORF,
    J. B. MCCALLA.